United States Patent [19]

Scott

[11] 4,283,768
[45] Aug. 11, 1981

[54] SIGNAL GENERATOR

[75] Inventor: Robert J. Scott, Furlong, Pa.

[73] Assignee: The United States of America as represented by the Secretary of the Navy, Washington, D.C.

[21] Appl. No.: 34,887

[22] Filed: Apr. 30, 1979

[51] Int. Cl.³ .................... G06J 1/00; H03B 19/00
[52] U.S. Cl. ............................... 364/607; 328/14; 328/18; 364/718
[58] Field of Search .............. 364/607, 608, 718, 721; 328/14, 27, 16–18, 20, 23, 28, 37; 84/1.01, 1.03, 1.13, 1.19, 1.17, 1.24

[56] References Cited

U.S. PATENT DOCUMENTS

| 3,735,269 | 5/1973 | Jackson | 328/14 |
| 3,772,681 | 11/1973 | Skingle | 364/607 X |
| 3,845,395 | 10/1974 | Murphree | 328/14 |
| 3,952,189 | 4/1976 | Fabricius | 328/14 X |
| 4,016,495 | 4/1977 | Machanian | 328/14 X |
| 4,073,209 | 2/1978 | Whittington et al. | 364/607 X |

Primary Examiner—Joseph F. Ruggiero
Attorney, Agent, or Firm—R. S. Sciascia; Henry Hansen; Stanton D. Weinstein

[57] ABSTRACT

A digital synthesizer is disclosed for generating complex waveforms of selected multiple frequencies and selected phases in the time domain. A plurality of independent frequency sources each produces square waves at its selected fundamental frequency and at frequencies which are integral multiples, such as twice, four times and eight times, that of the fundamental. A sampling clock whose frequency is at least the highest frequency produced by any frequency source, multiplied by the number of fundamentals used, provides a signal to a binary counter whose output is connected to a line decoder or multiplexer which multiplexes each frequency source's signals on a time-share basis via a system of AND and OR gates. The signal produced by the OR gates is provided to address a memory device which contains a predetermined waveform in a look-up table. The signal produced by the memory device is therefore the multiplexed combination of the signals that would have been produced therefrom had each frequency source alone been applied to address the memory. The complex waveform produced by the memory is provided to a plurality of serial in-parallel out shift registers whose outputs are applied to a plurality of digital-to-analog converters each producing identical waveforms time-delayed with respect to each other.

7 Claims, 2 Drawing Figures

SIGNAL GENERATOR

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION

The present invention relates to signal generators and processors, and more particularly to digital systems capable of producing complex digital or analog waveforms.

Signals having complex as opposed to simple waveforms are often required for various purposes. Examples of such complex signals are those in the audio range (20 Hz to 20 kHz) encountered in music, machinery noises, and animal sounds and other natural phenomena. Signals having complex waveforms can be produced by utilizing an analog summer to linearly sum the signals produced by several different analog frequency waveform generators. Such generation of complex waveforms requires several inherently narrow range analog filters and their accompanying circuitry, the number thereof increasing with increased complexity of the desired output waveform. However, several analog generators must be used to obtain complex waveforms, and the number of such generators used must increase with increased complexity of the desired output waveform. Also, a different set of analog signal generators must be used if a different type of waveform is desired. In addition linear time delay and phase shifting, especially to a substantial degree, of analog signals is especially difficult if not impossible, particularly since substantial time delay of a signal can affect fidelity of the signal and cause distortion in the frequency components. Furthermore, an analog system requires expensive, high-quality components, and are difficult to design within close tolerances, particularly over the entire audio range.

SUMMARY OF THE INVENTION

Accordingly, it is a general purpose of the present invention to provide a signal generator capable of producing complex analog waveforms.

Other objects of the present invention are to provide a waveform synthesizer which is digital, does not require a separate inherently narrow range analog filter (with accompanying circuitry) for each frequency desired, is useful in test apparatus, audio generators and polyphonic musical instruments such as electronic organs, is capable of frequency independent wave shaping, can provide a complex waveshape precisely controlled in frequency and phase, is capable of waveform synthesis in the time domain, and is capable of imposing a substantial time delaying or phase shift on the produced signal without adversely affecting signal fidelity.

Further objects of the present invention are to provide a digital source of multiple-frequency component complex waveforms in the audio frequency band, capable of precisely controlling the complex wave shape and, among several output signals, the relative time or phase relation of the output signals, capable of utilizing low cost, non-critical digital components, capable of simultaneously synthesizing complex waveforms, capable of synthesis of and generating and reproducing complex waveforms in the time domain, and capable of synthesis of and generating and reproducing audio waveforms in the time domain.

Still further objects of the present invention are to provide a digital synthesizer capable of producing complex analog waveforms without requiring a multiplicity of analog waveform generators of the variety involved in the desired output signal, and not requiring a plurality of different analog signal generators for different desired output waveforms.

Briefly, these and other objects of the present invention are accomplished by a signal generator wherein a plurality of periodic signals from appropriate sources are multiplexed to address an array or memory device containing successive values of a predetermined waveform as digital data corresponding to appropriate addresses. Such data as so addressed is provided to devices capable of time-delaying the data so that digital-to-analog converters connected thereto each produce a periodic analog signal whose basic waveform corresponds to that stored in the array or memory device. The various digital-to-analog converter output signals are identical to each other except for being of different phase with respect to each other. The signal generator includes a plurality of frequency sources or generators, each of which produces a periodic signal of different fundamental frequency and if desired harmonic signals whose respective frequencies are integral multiples of the fundamental frequency.

Other objects, advantages and novel features of the invention will become apparent from the following detailed description of the invention when considered in conjunction with the accompanying drawings wherein:

DESCRIPTION OF THE PREFERRED EMBODIMENT

Figure 1:
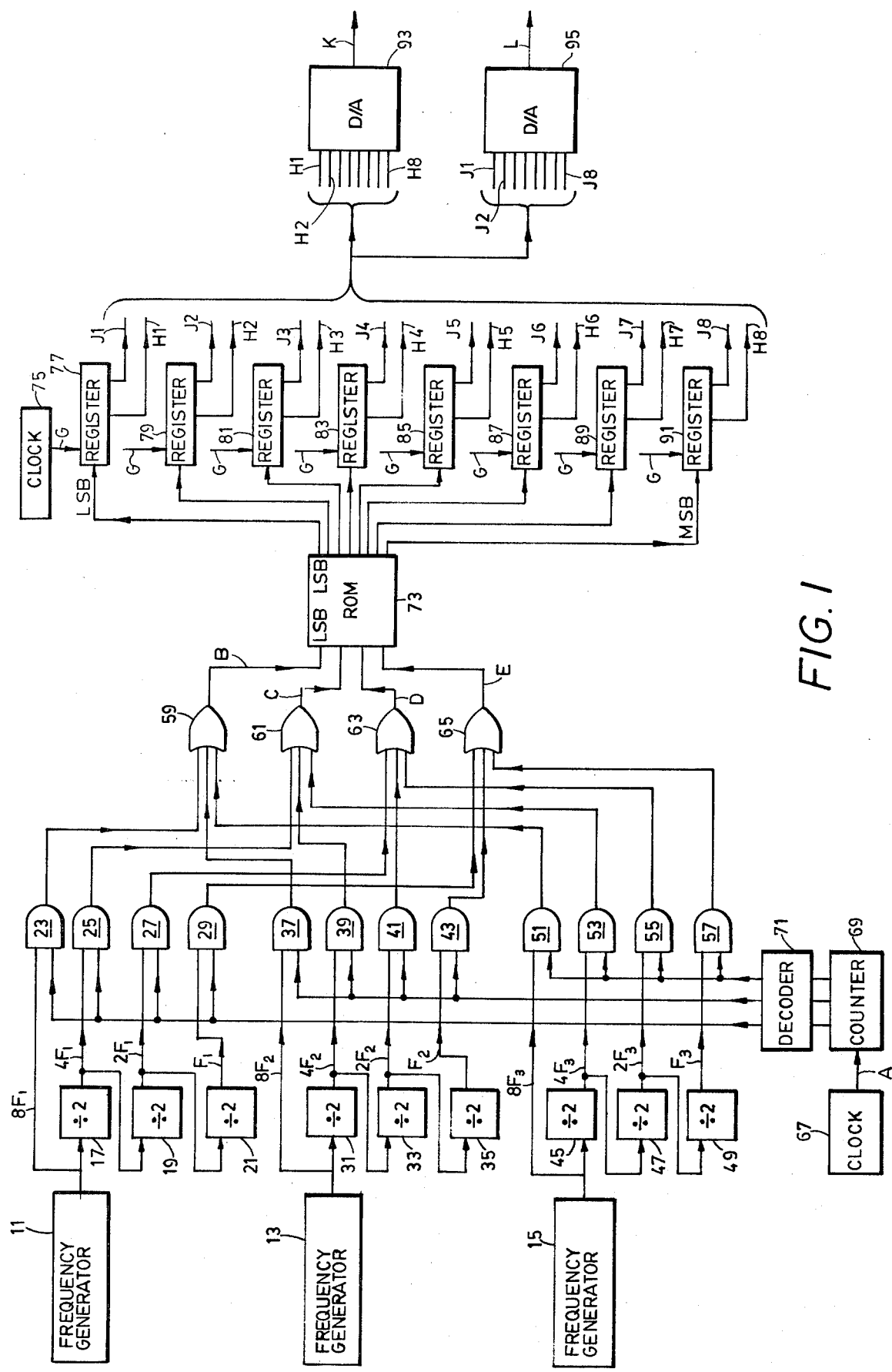
FIG. 1 is a block diagram of a waveform synthesizer according to the present invention.

Referring now to the drawings, there is shown in FIG. 1 a system capable of producing a complex waveform, and including three frequency generators or sources 11, 13 and 15, each producing a periodic signal or waveform of a predetermined frequency, preferably one different from the frequency of the signal or waveform produced by any other generator. Such an output signal can, for example, be a square wave, a sinusoid, a sawtooth wave, or any other periodic signal or waveform. Alternatively, any plurality of such generators can be utilized. The output of each frequency generator 11, 13 and 15 is provided to a respective series of divide-by-two counters 17, 19, 21 or 31, 33, 35 or 45, 47, 49 connected in series or cascade. The output of each frequency generator 11, 13 and 15 and of each divide-by-two counter 17, 19, 21, 31, 33, 35, 45, 47 and 49 is provided to a respective AND gate 23, 37, 51, 25, 27, 29, 39, 41, 43, 53, 55 and 57. Thus, an AND gate receives a signal indicative of that produced by a frequency generator 11, 13 or 15, or a signal having one-half, one-quarter, or one-eighth of the frequency thereof, depending on which divide-by-two counter output signal is received by the AND gate. Accordingly, frequency generator 11 provides a signal indicative of eight times the frequency of fundamental frequency signal $F_1$ ($8F_1$) to gate 23. Accordingly, generator 11, counter 17 connected thereto to receive the output signal $8F_1$ thereof, counter 19 connected to receive the output signal $4F_1$ of counter 17, and counter 21 connected to receive the output signal $2F_1$ of counter 19, respectively produce respective signals $8F_1$, $4F_1$, $2F_1$, and $F_1$ respectively indicative of eight times ($8F_1$), four times ($4F_1$), or twice ($2F_1$) the frequency of fundamental frequency signal $F_1$, or of signal $F_1$, which signals are provided to respective AND gates 23, 25, 27 and 29. Similarly, generator 13, counter 31 connected thereto to receive the output signal $8F_2$ thereof, counter 33 connected to receive the output signal $4F_2$ of counter 31, and counter 35 connected to receive the output signal $2F_2$ of counter 33, each produces a respective signal $8F_2$, $4F_2$, $2F_2$ or $F_2$ respectively indicative of eight times ($8F_2$), four times ($4F_2$), or twice ($2F_2$) the frequency of fundamental frequency signal $F_2$, or of signal $F_2$, and provides it to respective AND gate 37, 39, 41 or 43. Similarly, frequency generator 15, counter 45 connected thereto to receive the output signal $8F_3$ thereof, counter 47 connected to receive the output signal $4F_3$ of counter 45, and counter 49 connected to receive the output signal $2F_3$ of counter 47, each produces a respective signal $8F_3$, $4F_3$, $2F_3$ or $F_3$ respectively indicative of eight times ($8F_3$), four times ($4F_3$), or twice ($2F_3$) the frequency of fundamental frequency signal $F_3$, or of signal $F_3$, each of which is provided to respective AND gate 51, 53, 55 or 57. OR gate 59 is connected to receive as input signals the output signals produced by AND gates 23, 37 and 51, and accordingly produces an output signal B indicative of $8F_1$ or $8F_2$ or $8F_3$. OR gate 61 is connected to receive as input signals the output signals produced by AND gates 25, 39 and 53, and accordingly produces an output signal C indicative of $4F_1$ or $4F_2$ or $4F_3$. OR gate 63 is connected to receive as input signals the output signals produced by AND gates 27, 41 and 55, and accordingly produces an output signal D indicative of $2F_1$ or $2F_2$ or $2F_3$. OR gate 65 is connected to receive as input signals the output signals produced by AND gates 29, 43 and 57, and accordingly produces an output signal E indicative of $F_1$ or $F_2$ or $F_3$. Output signals B, C, D, and E respectively produced by OR gates 59, 61, 63 and 65 are provided to address array or memory device 73, signal B being received as the least significant bit (LSB) and signals C, D, E being received as progressively significant address bits, respectively. Memory device 73 can for example be a Read-Only Memory (ROM) device. Signal E produced by OR gate 65 is received by array or memory device 73 as the most significant bit (MSB). Memory device 73 can for example be a $16 \times 8$ bit memory device. If the number of OR gates providing signals to memory device 73 were doubled, which would require four additional AND gates per frequency generator utilized, as well as four additional counters connected in series or cascade to each frequency generator utilized, then memory device 73 could for example be a $256 \times 8$ bit ROM. AND gates 23, 25, 27, 29, 37, 39, 41, 43, 51, 53, 55 and 57 are multiplexed by multiplexing clock 67, counter 69 and decoder 71. Multiplexing clock 67 produces a periodic waveform, signal A of FIG. 2 which can be any periodic waveform of predetermined frequency such as a square wave, which signal is provided to binary counter 69. The frequency of clock 67 signal A determines the rate of sampling of the address signals $8F_1$, $4F_1$, $2F_1$, $F_1$, $8F_2$, $4F_2$, $2F_2$, $F_2$, $8F_3$, $4F_3$, $2F_3$, $F_3$ produced by generators 11, 13 and 15 and by counters 17, 19, 21, 31, 33, 35, 45, 47 and 49. This rate must be sufficiently high so that data is not lost, as determined by the Nyquist criteria. For the illustrative fragment shown in FIG. 2, signal $8F_3$ has the highest frequency of interest. To satisfy the Nyquist criteria, each signal sampled must be sampled at least twice per cycle thereof. Since each fundamental frequency signal with its harmonics is sampled in sequence, clock 67 signal A must have a frequency of at least the highest frequency sampled times the number N of fundamental frequencies sampled. For FIGS. 1 and 2, there are three such fundamental frequencies (those of signals $F_1$, $F_2$ and $F_3$). Thus, for the signals shown in FIG. 2, the minimum clock 67 signal A frequency is three times the frequency of harmonic signal $8F_3$. Counter 69 is pulsed by clock 67 signal A to produce a binary number which increases with each pulse of signal A from an initial minimum value such as zero and then returns to the minimum value after reaching a preset maximum or limit value. Alternatively, counter 69 can be pulsed by clock 67 signal A to produce a binary number which, with each signal A pulse, decreases from a preset initial maximum value to a preset minimum value, and then is reset to return to the initial maximum value. The number of counting positions available in counter 69 should be equal to the number of frequency generators utilized in the system. Where three such generators 11, 13, and 15 are so utilized, counter 69 can for example count upwards from $00_2$ to $01_2$ to $10_2$ and then return to $00_2$. The binary signal produced by counter 69 can be produced in parallel or serial form, and is provided to and received by line decoder 71. Decoder 71 is provided with a plurality of parallel output signal lines, each of which can be addressed by an appropriate input signal received by the decoder to have an appropriate output signal placed on it by the decoder. Thus, decoder 71 decodes the binary value provided to it from counter 69 into a single address line. The decoder 71 signal output lines are thus turned on sequentially to turn on the AND gates 23, 25, 27, 29, 37, 39, 41, 43, 51, 53, 55 and 57 sequentially in groups of, for example, four, to generate address strings through the OR gates 59, 61, 63 and 65 to memory device 73. Each output line from decoder 71 is connected to all of the AND gates connected to receive signals from one frequency generator 11, 13 or 15 and its associated counters connected thereto, so that signals originating from that particular frequency generator will appear at the inputs of OR gates 59, 61, 63 and 65 and of memory device 73 if decoder 71 has placed a signal on its corresponding output line therefor. Thus, clock 67 effects the sequential multiplexing of each particular frequency generator's output signals. Decoder 71 can for example be a binary to n-line decoder. Decoder 71 should have one output signal line for each frequency generator utilizing the system. Decoder 71 can for example be a one line of three decoder and have three output lines where three different frequency generators are utilized in the system. Thus, signals B, C, D and E can address memory device 73 as, for example, a decreasing 4-bit binary count which addresses memory device 73 sequentially at varying frequencies dependent upon the fundamental frequencies $F_1$, $F_2$, $F_3$ produced by each of the frequency generators, and the multiplexing rate set by clock 67. While decoder 71 does not apply a predetermined multiplexing signal to an AND gate, that gate does not produce a signal indicative of its received frequency signal, until the gate also receives a multiplexing signal from decoder 71. Each frequency generator 11, 13 and 15 with its respective connected counters 17, 19, 21, 31, 33, 35, 45, 47 and 49 provides, at a frequency equal to that of signal $8F_1$, a string of numbers in binary code such as in four-bit form. Each of these numbers corresponds to an address which indicates a position along the waveform to be produced, which is contained in memory device 73. For example, position $6_{10} = 0110_2$ corresponds to the point at the sixth clock increment along the base waveshape. A second frequency source 13 would have its address stream time-shared serially with the first by decoder 71. This second address stream has addresses being generated at a different frequency (that of signal $8F_2$) than that of the first source 11. Additional address streams are likewise serially multiplexed in the AND gate network. The output of the network formed by OR gates 59, 61, 63 and 65 then is the serially combined string of addresses generated by all of the frequency sources 11, 13 and 15 and their associated counters 17, 19, 21, 31, 33, 35, 45, 47 and 49. Each address in memory device 73 corresponds to a particular amplitude of the complex waveshape loaded into the memory device. When the serially combined address stread from the frequency generators and counters enters memory device 73 as addresses, the output of the memory device is a string of amplitudes in the form of digital numbers. These amplitude numbers can then be time delayed or displaced by shift registers 77, 79, 81, 83, 85, 87, 89 and 91 and then digital-to-analog converted by converters 93 and 95.

Array or memory device 73 can contain any waveform or other information desired. Memory device 73 essentially serves as a look-up table containing stored information which can be produced or outputted when appropriately addressed. This information can be any waveform, periodic, aperiodic or otherwise, or any other desired information. Table I below shows one example of a waveform, specifically a ramp or sawtooth waveform, which can be so stored in memory device 73, for example in a ROM:

TABLE I

| ADDRESS | | | | DATA OR VALUE | | | | | | | |
|---|---|---|---|---|---|---|---|---|---|---|---|
| E | D | C | B | MSB | | | | | | | LSB |
| 0 | 0 | 0 | 0 | 0 | 0 | 0 | 0 | 0 | 0 | 0 | 0 |
| 0 | 0 | 0 | 1 | 0 | 0 | 0 | 0 | 0 | 0 | 0 | 1 |
| 0 | 0 | 1 | 0 | 0 | 0 | 0 | 0 | 0 | 0 | 1 | 0 |
| 0 | 0 | 1 | 1 | 0 | 0 | 0 | 0 | 0 | 0 | 1 | 1 |
| 0 | 1 | 0 | 0 | 0 | 0 | 0 | 0 | 0 | 1 | 0 | 0 |
| 0 | 1 | 0 | 1 | 0 | 0 | 0 | 0 | 0 | 1 | 0 | 1 |
| 0 | 1 | 1 | 0 | 0 | 0 | 0 | 0 | 0 | 1 | 1 | 0 |
| 0 | 1 | 1 | 1 | 0 | 0 | 0 | 0 | 0 | 1 | 1 | 1 |
| 1 | 0 | 0 | 0 | 0 | 0 | 0 | 0 | 1 | 0 | 0 | 0 |
| 1 | 0 | 0 | 1 | 0 | 0 | 0 | 0 | 1 | 0 | 0 | 1 |
| 1 | 0 | 1 | 0 | 0 | 0 | 0 | 0 | 1 | 0 | 1 | 0 |
| 1 | 0 | 1 | 1 | 0 | 0 | 0 | 0 | 1 | 0 | 1 | 1 |
| 1 | 1 | 0 | 0 | 0 | 0 | 0 | 0 | 1 | 1 | 0 | 0 |
| 1 | 1 | 0 | 1 | 0 | 0 | 0 | 0 | 1 | 1 | 0 | 1 |
| 1 | 1 | 1 | 0 | 0 | 0 | 0 | 0 | 1 | 1 | 1 | 0 |
| 1 | 1 | 1 | 1 | 0 | 0 | 0 | 0 | 1 | 1 | 1 | 1 |

Memory device 73 essentially serves as a look-up table with the data contained within serving as the ordinate value of a function and the address for that particular data serving as the corresponding abscissa. Only one period of a periodic signal need be stored in memory device 73. Where the respective signals produced by OR gates 59, 61, 63 and 65 correspond to the illustrative examples of signals B, C, D and E shown in FIG. 2, and where the waveform or other function stored in memory device 73 corresponds to that shown in illustrative Table I given above, then the address signals received by and the data signals produced by memory devices 73 for a full cycle of signal $F_1$ would be as shown in Table II given below:

TABLE II

| ADDRESS | | | | DATA | | | | | | | |
|---|---|---|---|---|---|---|---|---|---|---|---|
| E | D | C | B | MSB | | | | | | | LSB |
| 1 | 1 | 1 | 1 | 0 | 0 | 0 | 0 | 1 | 1 | 1 | 1 |
| 1 | 1 | 1 | 1 | 0 | 0 | 0 | 0 | 1 | 1 | 1 | 1 |
| 1 | 1 | 1 | 0 | 0 | 0 | 0 | 0 | 1 | 1 | 1 | 0 |
| 1 | 1 | 1 | 0 | 0 | 0 | 0 | 0 | 1 | 1 | 1 | 0 |
| 1 | 1 | 0 | 1 | 0 | 0 | 0 | 0 | 1 | 1 | 0 | 1 |
| 1 | 1 | 0 | 0 | 0 | 0 | 0 | 0 | 1 | 1 | 0 | 0 |
| 1 | 1 | 0 | 1 | 0 | 0 | 0 | 0 | 1 | 1 | 0 | 1 |
| 1 | 1 | 0 | 0 | 0 | 0 | 0 | 0 | 1 | 1 | 0 | 0 |
| 1 | 0 | 1 | 0 | 0 | 0 | 0 | 0 | 1 | 0 | 1 | 0 |
| 1 | 1 | 0 | 0 | 0 | 0 | 0 | 0 | 1 | 1 | 0 | 0 |
| 1 | 0 | 1 | 0 | 0 | 0 | 0 | 0 | 1 | 0 | 1 | 0 |
| 1 | 0 | 0 | 0 | 0 | 0 | 0 | 0 | 1 | 0 | 0 | 0 |
| 1 | 0 | 1 | 1 | 0 | 0 | 0 | 0 | 1 | 0 | 1 | 1 |
| 1 | 0 | 0 | 1 | 0 | 0 | 0 | 0 | 1 | 0 | 0 | 1 |
| 0 | 1 | 1 | 0 | 0 | 0 | 0 | 0 | 0 | 1 | 1 | 0 |
| 1 | 0 | 0 | 1 | 0 | 0 | 0 | 0 | 1 | 0 | 0 | 1 |
| 0 | 1 | 1 | 1 | 0 | 0 | 0 | 0 | 0 | 1 | 1 | 1 |
| 0 | 1 | 1 | 0 | 0 | 0 | 0 | 0 | 0 | 1 | 1 | 0 |
| 1 | 0 | 0 | 0 | 0 | 0 | 0 | 0 | 1 | 0 | 0 | 0 |
| 0 | 1 | 1 | 0 | 0 | 0 | 0 | 0 | 0 | 1 | 1 | 0 |
| 0 | 0 | 1 | 0 | 0 | 0 | 0 | 0 | 0 | 0 | 1 | 0 |
| 0 | 1 | 1 | 1 | 0 | 0 | 0 | 0 | 0 | 1 | 1 | 1 |
| 0 | 1 | 0 | 0 | 0 | 0 | 0 | 0 | 0 | 1 | 0 | 0 |
| 0 | 0 | 0 | 0 | 0 | 0 | 0 | 0 | 0 | 0 | 0 | 0 |
| 0 | 1 | 1 | 0 | 0 | 0 | 0 | 0 | 0 | 1 | 1 | 0 |
| 0 | 0 | 1 | 1 | 0 | 0 | 0 | 0 | 0 | 0 | 1 | 1 |
| 1 | 1 | 1 | 0 | 0 | 0 | 0 | 0 | 1 | 1 | 1 | 0 |
| 0 | 1 | 0 | 1 | 0 | 0 | 0 | 0 | 0 | 1 | 0 | 1 |
| 0 | 0 | 0 | 1 | 0 | 0 | 0 | 0 | 0 | 0 | 0 | 1 |
| 1 | 1 | 0 | 0 | 0 | 0 | 0 | 0 | 1 | 1 | 0 | 0 |
| 0 | 0 | 1 | 1 | 0 | 0 | 0 | 0 | 0 | 0 | 1 | 1 |
| 0 | 0 | 0 | 0 | 0 | 0 | 0 | 0 | 0 | 0 | 0 | 0 |
| 1 | 0 | 1 | 0 | 0 | 0 | 0 | 0 | 1 | 0 | 1 | 0 |
| 0 | 0 | 1 | 0 | 0 | 0 | 0 | 0 | 0 | 0 | 1 | 0 |
| 1 | 1 | 1 | 0 | 0 | 0 | 0 | 0 | 1 | 1 | 1 | 0 |
| 1 | 0 | 0 | 0 | 0 | 0 | 0 | 0 | 1 | 0 | 0 | 0 |
| 0 | 0 | 0 | 1 | 0 | 0 | 0 | 0 | 0 | 0 | 0 | 1 |
| 1 | 1 | 0 | 1 | 0 | 0 | 0 | 0 | 1 | 1 | 0 | 1 |
| 0 | 1 | 1 | 0 | 0 | 0 | 0 | 0 | 0 | 1 | 1 | 0 |
| 0 | 0 | 0 | 0 | 0 | 0 | 0 | 0 | 0 | 0 | 0 | 0 |

Figure 2:
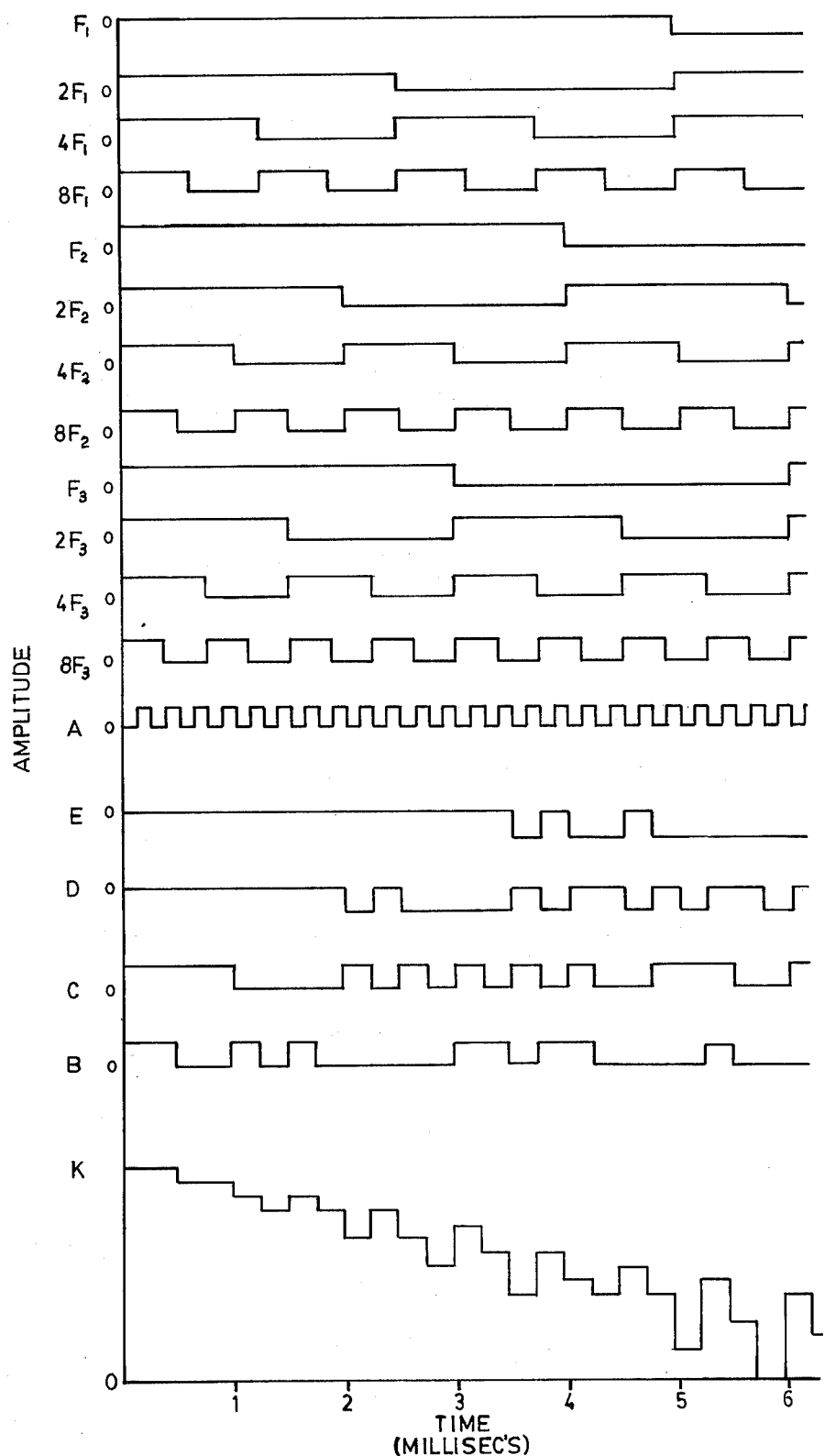
FIG. 2 is a waveform timing chart describing signals generated by the waveform synthesizer of FIG. 1.

In this example, memory device 73 can provide each data word of Table II in series as parallel bits (in word serial/bit parallel form) to a plurality of, for example, eight serial input-parallel output shift registers 77, 79, 81, 83, 85, 87, 89 and 91, connected to memory device 73 in parallel. For example, the most significant bit produced by memory device 73 can be provided to register 91, the next register 89 receiving the next most significant bit, etc., and register 77 can receive the least significant bit of the data word. A portion of the data shown in Table II is shown as signal K of FIG. 2, as is further discussed below. Each shift register 77, 79, 81, 83, 85, 87, 89 and 91 is provided with at least the same number of output lines as the number M of different phases of output desired. The number of registers utilized should correspond to the number of parallel bits of data per word produced by memory device 73. Each register 77, 79, 81, 83, 85, 87, 89 and 91 is clocked by signal G produced by time delay clock 75. Signal G produced by time delay clock 75 can for example be a periodic signal of any desired waveform such as that shown in FIG. 2 for clock 67 signal A, and should have a frequency equal to (preferably) or greater than that of signal A. Clock 75 signal G can have any periodic waveform, such as a square wave, a sinusoid or a sawtooth. Clock 75 pulses the registers to shift out the data received from memory device 73 to a plurality of digital-to-analog converters, each of which has the same bit-reception capacity as the number of registers utilized. For example, two eight-bit converters 93 and 95 can be utilized, each converter receiving a digital signal having a different time delay or displacement. Since the parallel digital signal J1-8 received by converter 95 is the same as that signal H1-8 received by converter 93 but with a fixed time delay imposed thereon by the registers 77, 79, 81, 83, 85, 87, 89 and 91, the analog signal L produced by converter 95 is out of phase with respect to the analog signal K produced by converter 93. Signals K and L represent the digital signal produced by memory device 73 in analog form but with one signal out of phase with respect to the other. System output signal K has imposed thereon a 0° phase shift by the registers. A portion of the analog equivalent of the data signal of Table II with 0° phase delay imposed thereon is illustrated as signal K of FIG. 2. Illustrative fragments of signals $F_1$, $2F_1$, $4F_1$, $8F_1$, $F_2$, $2F_2$, $4F_2$, $8F_2$, $F_3$, $2F_3$, $4F_3$, $8F_3$, A, B, C, D, E and K are shown in FIG. 2. As can be seen in FIG. 2, signal K includes three decreasing periodic ramp signals, each of different slope and thus different periods, which have been multiplexed. Signals K and L produced by converters 93 and 95, respectively, have the sharply defined signals such as is shown for signal K in FIG. 2; however, connecting appropriate filters at the output of converter 93 and of converter 95 to filter signals K and L can produce a signal wherein these corners are more rounded and a smoother waveform thereby results. Registers 77, 79, 81, 83, 85, 87, 89 and 91 can produce any number of time-delayed signals desired for any number M of digital-to-analog converters desired. These signals can be combined if desired before or after digital to analog conversion thereof to provide further complexity to the final output signal produced. Any number N of frequency generators, and M of digital-to-analog converters (and so of shift register output ports and time-delayed output signals), can be utilized and need not necessarily be equal numbers.

Any AND gate utilized in the present invention can for example be one-fourth of an SN7408 device. Any divide-by-two counter utilized can be for example one-third of an SN7493 device. A flipflop can be utilized as a divide-by-two counter. Counter 69 can for example be a SN7493 device. Decoder 71 can for example be a SN74LS138 device. An OR gate can for example be one-fourth of a SN7432 device. Memory device 73 can for example be a SN74188 PROM device or alternatively a SN7488 ROM device. A shift register 79, 81, 83, 85, 87, 89 or 91 utilized herein can for example be a SN74164 device. Decoder 71, AND gates 23, 25, 27, 29, 37, 39, 41, 43, 51, 53 55 and 57, and OR gates 59, 61, 63 and 65 can for example be replaced by four SN74151 or SN74150 devices. Any conventional digital-to-analog converter can be utilized as converters 93 or 95 in the present invention. Any conventional clock or frequency generator can be utilized as clocks 67 or 75, or frequency generators 11, 13 or 15, respectively, in the present invention.

Signals $F_1$, $F_2$ and $F_3$ can for example be in the audio range (20 Hz to 20 KHz). For example, the respective frequencies of signals $F_1$, $F_2$ and $F_3$ can be 100 Hertz, 125 Hertz, and 167 Hertz, respectively, with corresponding respective periods of 10 milliseconds, 8 milliseconds and 6 milliseconds, respectively. An illustrative fragment of the signals produced in the system of FIG. 1 for these illustrative values of $F_1$, $F_2$ and $F_3$ is shown in FIG. 2. The rate of sampling of the various signals originating from frequency generators 11, 13 and 15 must be at least equal to the above Nyquist minimum of N times the highest frequency sampled. The rate of sampling and thus the clock signal A frequency, where $8F_3$ has the highest frequency of 1336 Hertz, can then for example be 4008 Hertz with a period of 0.2495 milliseconds or 249.5 microseconds.

Each frequency generator or source 11, 13 and 15 together with the counters connected thereto can produce in the time domain an increasing or decreasing binary count. Where three counters are used with a frequency generator, a four-bit binary count between $0000_2$ and $1111_2$ would be accomplished, with the resulting counting sequence going from one end of the count to the other, and then being reset at the beginning of the count. For the illustrative fragment shown in FIG. 2, there is shown a count decreasing from $1111_2$ or $F_{16}$ to $0000_2$ or $0_{16}$ which is reset to $1111_2$ upon reaching $0000_2$. If desired, appropriate converters can be placed on the signals provided to the corresponding AND gates by the frequency generators and the counters in order to obtain a count increasing from $0000_2$ to $1111_2$ which is then reset to $0000_2$. If a greater or lesser number of bits in the count are desired, the number of divide-by-n counters (n being any integer) used with each frequency generator can be varied accordingly. For example, if an eight-bit count is desired, seven divide-by-two counters can be used with a single frequency generator instead of the three counters shown in FIG. 1. Such a system would produce a count increasing or decreasing between $00000000_2$ and $11111111_2$, for finer definition of the final output signal K or L. Such an arrangement would also require a larger number of address line inputs of memory device 73. If a smaller number of address lines is needed than is actually provided by the particular memory device 73 utilized, then certain unneeded high-order address lines can be provided with a fixed high or low-level signal or voltage as desired.

As another example, memory device 73 can be programmed to produce, on a plot of data versus corresponding address, a sine wave. A sinusoidal analog signal of frequency $f_1$ has a Fourier transform plot consisting of a single vertical line parallel to the ordinate and intersecting the abscissa or frequency axis at value $f_1$. Similarly, an analog sinusoidal signal of frequency $f_2$ greater than $f_1$ has a Fourier transform plot consisting of a single line of fixed length parallel to the ordinate and intersecting the abscissa or frequency axis at value $f_2$. A simple sum of these two frequencies in the time domain yields a transform plot which is a super-position of the individual spectra, that is the above $f_1$ line and the above $f_2$ line placed on the same amplitude vs. frequency axes. If either of these two sinusoidal signals are time-sampled at a sampling rate $f_s$ greater than or equal to the Nyquist minimum, the Fourier transform plot of the resulting sampled signal consists of two vertical lines, one at the frequency of the original signal and one at frequency $f_s$, which is considered the effective equivalent of the original signal. The system of FIG. 1 accomplishes multiplexing interleaving of a plurality of signals of fixed frequency. If memory device 73 is programmed to produce a sinusoidal signal, and two appropriate frequency generators with divide-by-two counters are utilized for addressing the memory device, two sinusoidal signals, one of frequency $f_1$ and one of frequency $f_2$, would be multiplexed or interleaved by the system of FIG. 1. The resulting Fourier transform plot of the resulting signal would be three vertical lines, each of fixed predetermined length, all parallel to the vertical or amplitude axis and respectively intersecting the horizontal or frequency axis at $f_1$, $f_2$ to the right thereof, and the sampling frequency $f_s$ substantially to the right of $f_1$ and $f_2$. Thus, sampling at greater than the Nyquist minimum frequency yields a similar Fourier transform to that produced by the simple analog sum of the two frequencies but including the sampling frequency, which is the Fourier transform of the above time-domain sum of frequencies $f_1$ and $f_2$ sampled at frequency $f_s$. By extension, the above would hold true for any number of frequencies $f_1, f_2, f_3, \ldots f_n$, provided the Nyquist criteria is satisfied. Therefore, the linear sum of several frequencies is substantially identical to the alternately sampled combination produced by the present invention. In the time domain, the latter would appear to constitute alternating time-portions or segments of each of the original signals.

In summary, operation of the foregoing embodiment of the invention is as follows. Each frequency generator 11, 13 and 15 produces a periodic waveform whose frequency is sequentially halved by an associated series of divide-by-two counters 17, 19, 21 or 31, 33, 35 or 45, 47, 49, respectively, connected thereto in series or cascade, to together produce an automatically reset increasing or decreasing series of binary numbers at a frequency proportional to that produced by the corresponding frequency generator 11, 13 or 15. Clock 67 pulses counter 69 to cause the output lines from decoder 71 to be turned on individually and sequentially to permit the series of number signals originating from only one frequency generator 11, 13 or 15 at a time to pass through a network of AND gates 23, 25, 27, 29, 37, 39, 41, 43, 51, 53, 55 and 57, thereby serially multiplexing the address stream originating from each frequency generator. The multiplexed address stream from the AND gates is applied via OR gates 59, 61, 63 and 65 to the address input ports of memory device 73. Memory device 73 has stored therein in a look-up table a predetermined waveform. The portion of this waveform addressed by the signals from OR gates 59, 61, 63 and 65 is provided in parallel to shift registers 77, 79, 81, 83, 85, 87, 89 and 91, with the first-named register receiving the least significant bit and the last-named register receiving the most significant bit. Time delay clock 75 signal G clocks this waveform signal out of the registers to any desired number of digital-to-analog converters 93 and 95 from which the final output signal, such as a complex audio waveform, can be produced. The registers 77, 79, 81, 83, 85, 87, 89 and 91 are each provided with a plurality of output ports so that a plurality of output signals, each time-delayed with respect to any other such signal, can be produced and converted to analog form.

It should be understood that the present invention can produce and utilize any desired number of address bits and data bits. The number of address bits used can be set by the number of divide-by-two counters and AND gates utilized with each frequency generator, the number of OR gates utilized in the system, and the number of available address input lines of the memory device used. If the number of divide-by-two counters utilized with each frequency generator is increased or decreased, then correspondingly the number of AND gates and OR gates utilized therewith should be correspondingly increased or decreased, as should be the number of address input lines of memory device 73. Also, if data in parallel form such as the bit parallel/word serial form shown in FIG. 1 (instead of pure serial form) is desired, the number of parallel data bits desired will determine the number of data output lines needed on the memory device utilized, the number of shift registers utilized, and the number of input ports to the digital-to-analog converters utilized. Any number of frequency generators can be utilized in the present invention, but each frequency generator utilized requires additional associated AND gates(s), counter 69 capacity, an additional decoder 71 output line for multiplexing the address signal produced thereby, and divide-by-two counters if desired. If so desired, the divide-by-two counters can be eliminated either by utilizing, in lieu of the frequency generators, a frequency generator capable of producing both a fundamental and appropriate harmonics or multiples thereof, or by substituting appropriate frequency generators which could be synchronized with each other for the counters. Memory device 73 can be any addressable memory array, for example a read-only-memory, a programmable read-only-memory, an erasable programmable read-only-memory, a battery-held random access memory, (BRAM), a random access memory, a register, core memory, or other memory device. Memory device 73 can contain any desired waveform. Such a waveform would then be addressed by the address stream originating from the various frequency generators utilized. Since the frequency generators provide an automatically reset and continuous binary count, only one period of such a waveform, if periodic, need be stored in memory device 73. Any number of digital-to-analog converters can be used to produce output signals of the system of FIG. 1. Each shift register utilized should be provided with an output port for each output signal of different time delay or phase shift desired. Also, the outputs of the various relatively time-delayed or time displaced or phase shifted signals produced by the shift registers can be combined before or after digital to analog conversion to produce further signal complexity if desired.

Some of the many advantages of the invention should now be readily apparent. For example, a novel signal generator or digital waveform synthesizer is provided wherein a plurality of independent square or other periodic waves are serially combined to address a fixed storage device programmed with a complex or other waveform so that waveforms such as complex audio waveforms are generated in the time domain. The sampling provided by decoder 71 and the AND gates connected thereto provides multiple multiplexed counts to the memory device for producing a multiplexed output signal derived from that contained in the memory device. Thus, complex waveforms can be produced without first reproducing the base waveform in analog form and without first producing a plurality of analog waveforms which must then be summed. Furthermore, the delays introduced by the shift registers can generate very long duration time delays and substantial phase-shifting without affecting the fidelity of the signal being so processed.

Obviously, many modifications of the present invention are possible in light of the above teachings. It is therefore to be understood that within the scope of the appended claims the invention may be practiced otherwise than as specifically described.

What is claimed is:

1. Apparatus for producing a waveform, comprising:

generating means for producing a first signal of a plurality of predetermined non-equal frequencies and harmonics thereof;

multiplexing means connected to receive the first signal for multiplexing each of the frequencies and its associated harmonic with the other frequencies and harmonics to produce a second signal consisting of a series of parallel digital addresses; and array means responsive to the second signal for producing a third signal consisting of a plurality of complex waveforms having different time delays.

2. Apparatus as recited in claim 1, wherein said array means further comprises:

memory means connected to receive the second signal for producing a fourth signal consisting of a series of parallel digital numbers corresponding with said second signal;

shifting means connected to receive the fourth signal for producing a a fifth signal which is a replica of the fourth signal with each number being time-displaced with respect to the numbers of said fourth signal; and converting means connected to receive the fifth signal for converting said fifth signal into the third signal.

3. Apparatus as recited in claim 2 wherein said shifting means comprises:

register means connected to receive said fourth signal for producing the fifth signal at different output ports of said register means; and timing means for providing a timing signal to said register means to successively clock the fourth signal from one position to another in said register means.

4. Apparatus as recited in claim 2 wherein said converting means comprises a plurality of digital-to-analog converters.

5. Apparatus as recited in claim 1 wherein said multiplexing means comprises:

sequencing means for producing a plurality of sequencing signals of binary value indicating which of the non-equal frequencies and any of the harmonics derived therefrom are to be provided during any one period of time from said multiplexing means to said array means as a portion of the second signal; and gating means connected to receive the non-equal frequencies, harmonics and the sequencing signals for providing to said array means during any one period of time one of the frequencies and any of the harmonics derived therefrom.

6. Apparatus as recited in claim 5 wherein said sequencing means comprises:

timing means for producing a periodic signal;

counting means responsive to the periodic signal for producing a counting signal indicative of a series of sequential values followed by resetting the series to an initial value of the series after the same number of values as the number of the frequencies has been indicated; and ordering means responsive to the counting signal for providing to said gating means the sequencing signals, one for each of the non-equal frequencies and the harmonic derived therefrom, and each having a different binary value.

7. Apparatus as recited in claim 6 wherein:

said timing means comprises a clock;

said counting means comprises a counter; and said ordering means comprises a line decoder.

* * * * *